United States Patent
Kamepalli et al.

(10) Patent No.: US 9,280,180 B2
(45) Date of Patent: Mar. 8, 2016

(54) INFORMATION HANDLING SYSTEM DISPLAY PANEL HAVING OFFSET SUPPORTING ELECTRONIC COMPONENTS

(71) Applicant: Dell Products L.P., Round Rock, TX (US)

(72) Inventors: Srinivas Kamepalli, Austin, TX (US); John T. Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 407 days.

(21) Appl. No.: 13/868,792

(22) Filed: Apr. 23, 2013

(65) Prior Publication Data

US 2014/0313699 A1 Oct. 23, 2014

(51) Int. Cl.
*G06F 1/16* (2006.01)
*F21V 33/00* (2006.01)
*G09G 3/00* (2006.01)
*G02F 1/1333* (2006.01)
*G02F 1/1335* (2006.01)

(52) U.S. Cl.
CPC .......... *G06F 1/1637* (2013.01); *F21V 33/0052* (2013.01); *G02F 1/133308* (2013.01); *G06F 1/1626* (2013.01); *G09G 3/00* (2013.01); *G02F 1/133603* (2013.01); *G02F 1/133608* (2013.01); *G02F 2001/133612* (2013.01); *Y10T 29/49002* (2015.01)

(58) Field of Classification Search
USPC ................. 362/97.2, 97.1, 97.3, 561
See application file for complete search history.

(56) References Cited

U.S. PATENT DOCUMENTS

| | | | | |
|---|---|---|---|---|
| 8,002,421 B2 * | 8/2011 | Song | ................ | G02F 1/133603 362/225 |
| 8,052,295 B2 * | 11/2011 | Kim | ................ | G02F 1/133603 362/225 |
| 8,147,115 B2 * | 4/2012 | Kiyose | ........................ | 362/633 |
| 8,162,500 B2 * | 4/2012 | Kim | ................ | G02F 1/133605 362/247 |
| 2003/0117790 A1 * | 6/2003 | Lee et al. | ........................ | 362/31 |
| 2004/0174488 A1 | 9/2004 | Tsai | | |
| 2005/0253980 A1 * | 11/2005 | Saito et al. | ................ | 349/64 |
| 2010/0296026 A1 * | 11/2010 | Kubota et al. | .................... | 349/62 |
| 2011/0267381 A1 * | 11/2011 | Yamazaki et al. | ............ | 345/690 |
| 2012/0201050 A1 * | 8/2012 | Kang et al. | ..................... | 362/611 |
| 2012/0275184 A1 * | 11/2012 | Kim et al. | ..................... | 362/602 |
| 2012/0320537 A1 | 12/2012 | Kaufman et al. | | |
| 2013/0002963 A1 * | 1/2013 | Yokota | ............. | G02F 1/133603 348/728 |
| 2013/0010231 A1 * | 1/2013 | Matsuki | ............ | G02F 1/133603 349/64 |
| 2013/0100648 A1 * | 4/2013 | Nozawa | ................ | G09F 13/04 362/97.2 |

FOREIGN PATENT DOCUMENTS

WO   WO2009140352 A1   11/2009

* cited by examiner

*Primary Examiner* — Laura Tso
(74) *Attorney, Agent, or Firm* — Terrile, Cannatti, Chambers & Holland, LLP; Robert W. Holland

(57) ABSTRACT

An information handling system provides connectors along a housing periphery with a reduced vertical footprint by adjusting a display circuit portion relative to a display panel portion to provide vertical space for the connectors. For example, the circuit portion aligns with the display panel portion along one side of the display to provide space for connectors at that side of the display, and the circuit portion extends past the perimeter of the display panel portion at an opposing side of the display. In one embodiment, the circuit portion extending outside the perimeter of the display panel portion includes circuits for powering a backlight disposed in the circuit portion.

20 Claims, 3 Drawing Sheets

INFORMATION HANDLING SYSTEM DISPLAY PANEL HAVING OFFSET SUPPORTING ELECTRONIC COMPONENTS

BACKGROUND OF THE INVENTION

1. Field of the Invention

The present invention relates in general to the field of information handling system displays, and more particularly to an information handling system display panel having offset supporting electronic components.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems are built in housings having a variety of configurations, such as a traditional clamshell configuration with an articulating lid, one of several convertible configurations that articulate a lid to a tablet-type of configuration, and a tablet configuration having a fixed display in a planar housing. End users typically select portable information handling systems based upon size and processing capability. For example, smaller tablet configurations, such as smartphones sized for use as a handset, offer convenience and ready portability but reduced processing capabilities. By comparison, portable "all-in-one" systems are essentially a tablet with a relatively large housing that offers less portability but has adequate room to include relatively powerful processing capabilities.

Tablet information handling systems have grown in popularity due to their convenience, such as the ability to make inputs through a touchscreen display. End users tend to use tablet information handling system touchscreens for performing tasks that have few inputs, such as browsing the Web and reading e-mails, but tend to use separate keyboard peripherals for tasks that call for more inputs, such as composing documents. Generally, end users select tablet information handling systems based on the size of the display included in the planar housing to provide adequate-sized images versus the convenience associated with housings having a smaller size. Generally, end users tend to prefer tablet information handling systems to have as little weight and thickness as possible. Thus, tablet information handling systems tend to have a planar housing having a size slightly larger than the display enclosed in the housing. For example, specifications issued by MICROSOFT relating to WINDOWS8 limit the size of the bezel used to enclose a display panel to 26 mm outside the perimeter of the display panel. One difficulty with restricting a tablet housing to substantially the same perimeter as a display held by the tablet housing is that the display tends to crowd out space in the perimeter of the tablet housing so that communication and power connectors have limited room at the perimeter of the housing. Thus, tablet information handling systems often have limited numbers of connector ports for communicating with external devices, such as USB, Ethernet, HDMI, DisplayPort, etc. . . . ports.

SUMMARY OF THE INVENTION

Therefore a need has arisen for a system and method which offsets display electronic components relative to a display panel to provide room at an information handling system housing perimeter for external connector ports.

In accordance with the present invention, a system and method are provided which substantially reduce the disadvantages and problems associated with previous methods and systems for disposing a display in an information handling system housing. A display circuit portion substantially aligns with a display panel portion at an area where peripheral ports are disposed along the vertical height adjacent to the circuit portion and display portion. The circuit portion extends outward from the display portion distal the peripheral ports, such as to provide room for circuits displaced by the positioning of the peripheral ports adjacent to the display.

More specifically, a tablet information handling system has a planar housing that holds a display in a centered position symmetrical to an end user. The display has a display panel portion that presents visual images from the centered position and a circuit portion disposed below the display panel portion that provides illumination to the display panel portion and/or other electrical circuit support functions. At least a portion of the circuit portion is offset relative to the display panel portion so that the circuit portion substantially aligns with the display panel portion in an area where peripheral connectors are disposed adjacent the display. For example, the circuit portion has a slightly greater perimeter than the display panel portion so that power circuits are disposed in the circuit portion outside the perimeter of the display portion. To allow substantial alignment of the circuit portion and display panel portion at the location of peripheral connectors, power circuits are moved from the alignment side to a different side of the circuit portion. Re-location of power circuits relative to the display panel portion adjusts spacing within the tablet housing between the display and housing perimeter to increase the space available for peripheral connectors while maintaining the display panel portion is a centered position of the housing. For example, the entire vertical height of the display is available along a portion of the tablet housing perimeter to place peripheral connectors since the display panel portion and circuit portion of the display align with each other.

The present invention provides a number of important technical advantages. One example of an important technical advantage is that offset of display electronics relative to a display panel provides room on another side of the housing, such as opposite the offset, to dispose device connectors exposed for access external to the housing. Removing the display electronics, such as a display printed circuit board, from one side of a housing provides additional vertical room, also known as Z height, so that connectors may be included adjacent the display without increasing the thickness of a portable information handling system. Offsetting display electronics allows for the display panel to remain centered and symmetrical relative to the housing while the display electronics are off center and nonsymmetrical to allow room along a perimeter of the information handling system housing for components other than the display, such as connectors accessible from external to the housing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system display offsets a circuit portion relative to a display panel portion so that the display panel portion couples in a symmetrical position relative to a housing, and the circuit portion couples non-symmetrical relative to the housing to allow placement of connectors along a portion of the housing perimeter. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
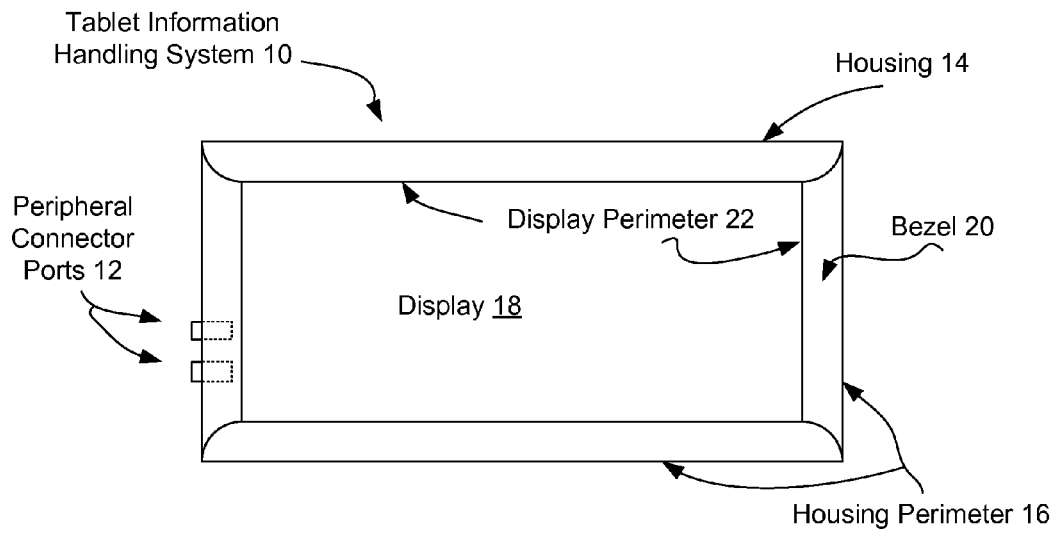
FIG. 1 depicts a tablet information handling system having peripheral connector ports disposed at a housing perimeter.

Referring now to FIG. 1, a tablet information handling system 10 is depicted having peripheral connector ports 12 disposed at a housing 14 perimeter 16. A display 18 is coupled to housing 14 in a symmetrical centered position relative to housing 14. In the example embodiment, a bezel 20 couples to housing 14 over display 18 so that the perimeter 22 of display 18 is substantially equal distance from the perimeter 16 of housing 14. In alternative embodiments, alternative housing arrangements may be used, such as paint or other applied materials that cover inactive portions of a protective glass of display 18. In one embodiment, bezel 20 has a uniform distance of no greater than 26 mm around display 18 so that display 18 is centered in housing 14 in accordance with MICROSOFT's WINDOWS8 specifications. In one alternative embodiment, a protective glass extends across display 18 to provide some active touch outside of a centered display presentation area. The present disclosure addresses the disposition of circuits within housing 14 that support presentation of images at display 18 with display 18 in a center position of housing 14 and is not limited to any particular housing, such as just the depicted tablet housing. For example, the present disclosure might apply to a lid portion of clamshell housing to permit peripheral connectors along the perimeter of the lid.

Figure 2:
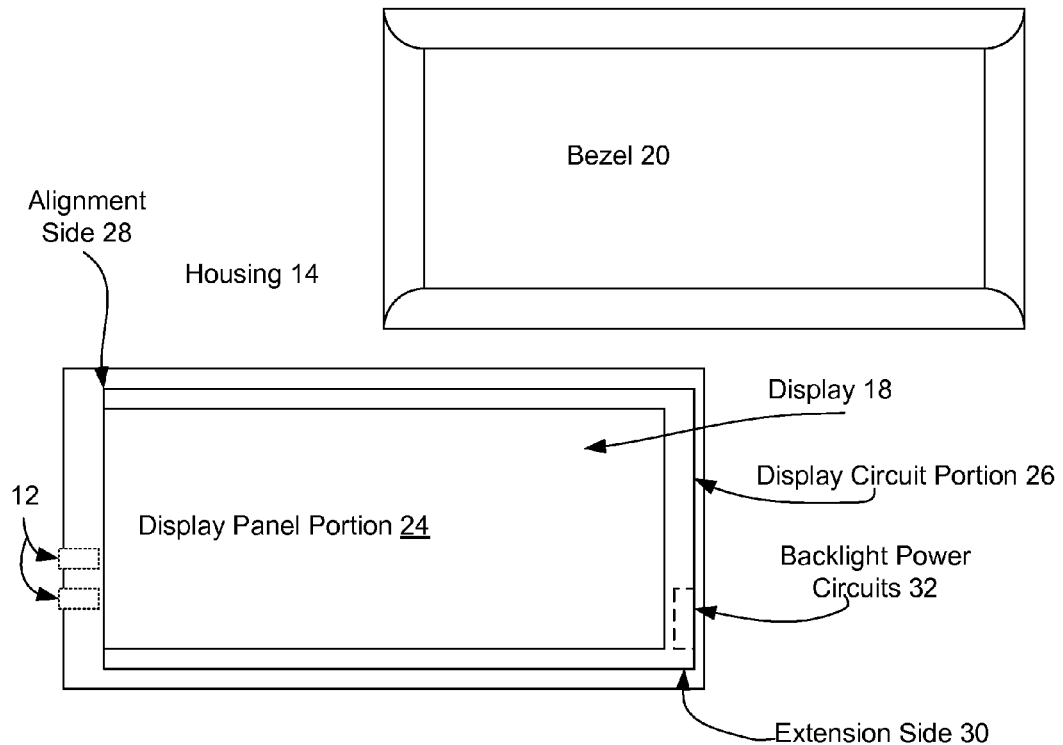
FIG. 2 depicts a tablet information handling system having an upper housing bezel portion removed to illustrate an example of position of components within the housing.

Referring now to FIG. 2, a tablet information handling system 10 is depicted having an upper housing bezel portion 20 removed to illustrate an example of a disposition of components within the housing 14. Conventional displays 18 have a display panel portion 24 that presents visual images by filtering light that passes through, such as with liquid crystal pixels in a liquid crystal display (LCD), and a circuit portion 26 that provides illumination through display panel portion 24 and other supporting electronic circuits and functions. Conventional displays 18 typically have circuit portion 26 extend uniformly just outside of the perimeter 22 of display portion 24 to provide an even distribution of light, such as with LED backlights distributed across the surface of the circuit portion 26. For example, power circuits located on circuit portion 26 just outside the perimeter 22 of display panel portion 24 provide power to LEDs or other backlight sources on circuit portion 26 that are located within perimeter 22. In order to provide room for peripheral ports 12 along the perimeter 16 of housing 14, FIG. 2 illustrates that circuit portion 26 aligns with display panel 24 on an alignment side 28 of display panel 24 and extends outward from perimeter 22 of display panel 24 at an extension side 30 of display panel 24. For example, backlight power circuits 32 are repositioned to extension side 30 of circuit portion 26 from alignment side 28 so that circuit portion 26 substantially aligns with display panel 24 on alignment side 28. Backlight power circuits 32 may provide power or control for illumination of liquid crystals in display panel portion 24. Substantial alignment of display panel portion 24 and circuit portion 26 leaves space between the perimeter 16 of housing 14 and the perimeter 22 of display 18 so that peripheral ports 12 fit within housing 14 at the perimeter 16.

Repositioning of circuit portion 26 to provide addition space along a portion of perimeter 22 of display panel portion 24 may use lateral or vertical space within housing 14. In the example embodiment depicted by FIG. 2, power circuits 32 are moved from alignment side 28 to an opposite extension side 30 so that extra room is made available at the perimeter 16 of housing 14 at extension side 30. In an alternative embodiment, power circuits 32 are repositioned to sides that are perpendicular to alignment side 28, or to a different part of alignment side 28 that does not have peripheral ports. As another alternative, vertical stacking of power circuits 32 may be used at a portion of circuit portion 26 to reposition the power circuits from alignment side 28 to a position above or below circuit portion 26, such as by communicating power through vias from power circuits disposed beneath circuit portion 26. For instance, a position is selected for power circuits 32 that minimizes wire lengths to LEDs powered by the power circuit 32. Alternatively, other types of circuits located in circuit portion 26 may be re-located. In one embodiment, some power circuits may remain at alignment side 28 with some re-positioned as needed to provide space for peripheral ports 12.

Figure 3:
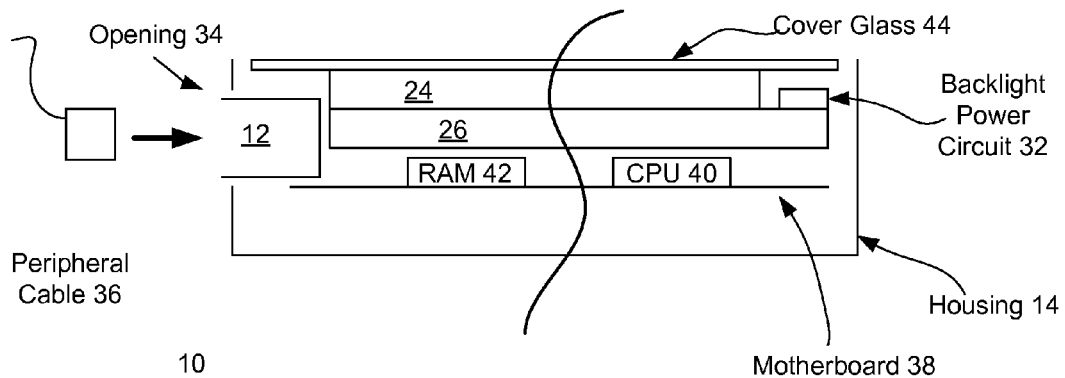
FIG. 3 depicts a side cutaway view of a tablet information handling system to illustrate a vertical overlap of peripheral connectors and a display in the housing.

Referring now to FIG. 3, a side cutaway view depicts a tablet information handling system 10 to illustrate a vertical overlap of peripheral connectors 12 and a display 18 in housing 14. In the example embodiment depicted by FIG. 3, peripheral port 12 aligns with an opening 34 at the perimeter 16 of housing 14 so that a peripheral cable 36 can couple with port 12. Peripheral port 12 is, for example, a USB, HDMI, DisplayPort, eSATA, or other type of port that interfaces with physical devices. Alternatively, other types of connectors may be placed at the position of peripheral port 12, such as power, microphone or speaker connectors. The inner portion of peripheral port 12 is adjacent to display 18 overlapping with the vertical position of display panel portion 24 and circuit portion 26. Moving circuit portion 26 towards the perimeter of display panel 24 provides additional vertical space for peripheral connectors in housing 14 adjacent to display 18. In the example embodiment, display portion 24 and circuit portion 26 are aligned with each other in the area where peripheral ports 12 are disposed. In alternative embodiments, substantial alignment of display portion 24 and circuit portion 26 may allow some lateral overlap of display portion 24 and circuit portion 26 as long as adequate lateral space exists in the vertical region where peripheral ports 12 are disposed.

In the example embodiment depicted by FIG. 3, a motherboard 38 disposed below display 18 supports a processor 40 that executes instructions and a memory 42 that stores instructions. Motherboard 38 interfaces with peripheral ports 12 to support communication between processor 42 and external devices through a peripheral cable 36. Display 18 on extension side 30 has circuit portion 26 extended outward from beneath display panel portion 24 to a position adjacent the outer perimeter of housing 14. Extending circuit portion 26 outwards towards housing 14 allows circuit portion 26 to use less space on alignment side 28, thus providing increased vertical room for peripheral ports 12. A cover glass 44 is disposed over display panel portion 24 for protection against external events. Display panel portion 24 is centrally placed in housing 14 to provide a symmetrical appearance to an end user looking at the front surface of tablet information handling system 10. Circuit portion 26 is non-symmetrical to an end user viewing from the same position, however, circuit portion 26 is not visible to the end user due to a bezel 20 or paint over cover glass 44 at the perimeter of housing 14.

Figure 4:
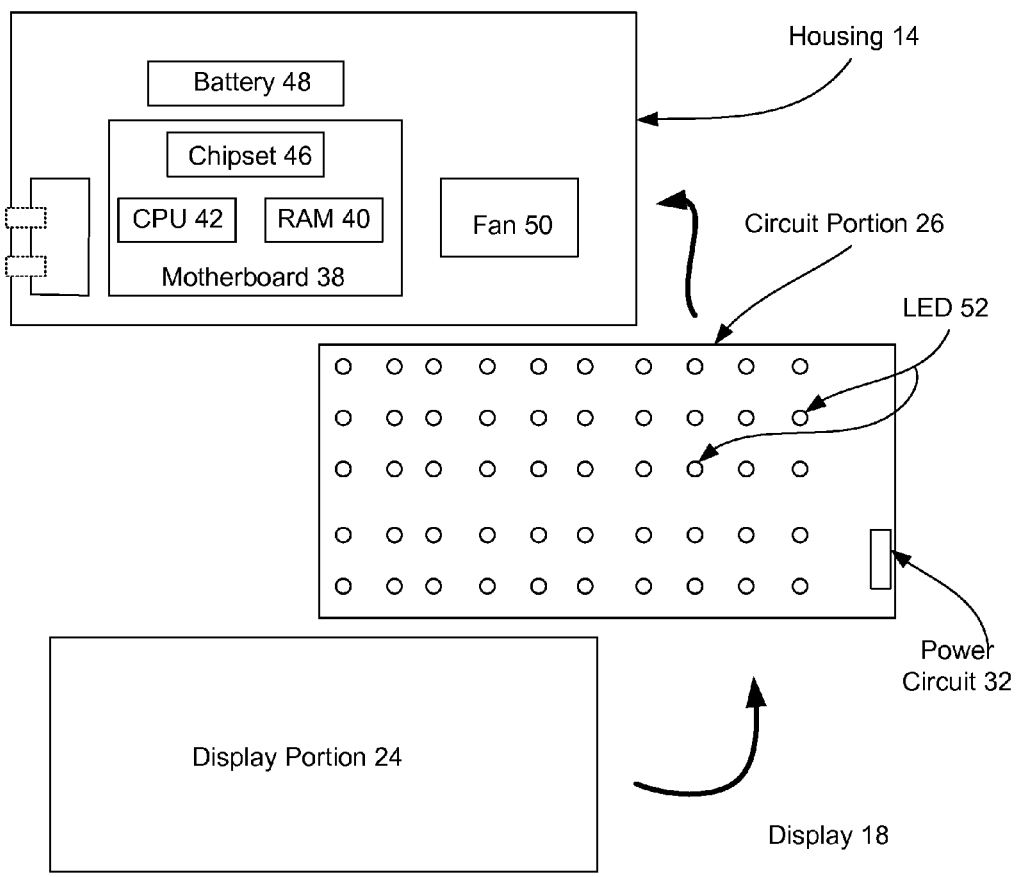
FIG. 4 depicts a blow-up view of a tablet information handling system to illustrate assembly of a display into a tablet housing.
Figure 5:
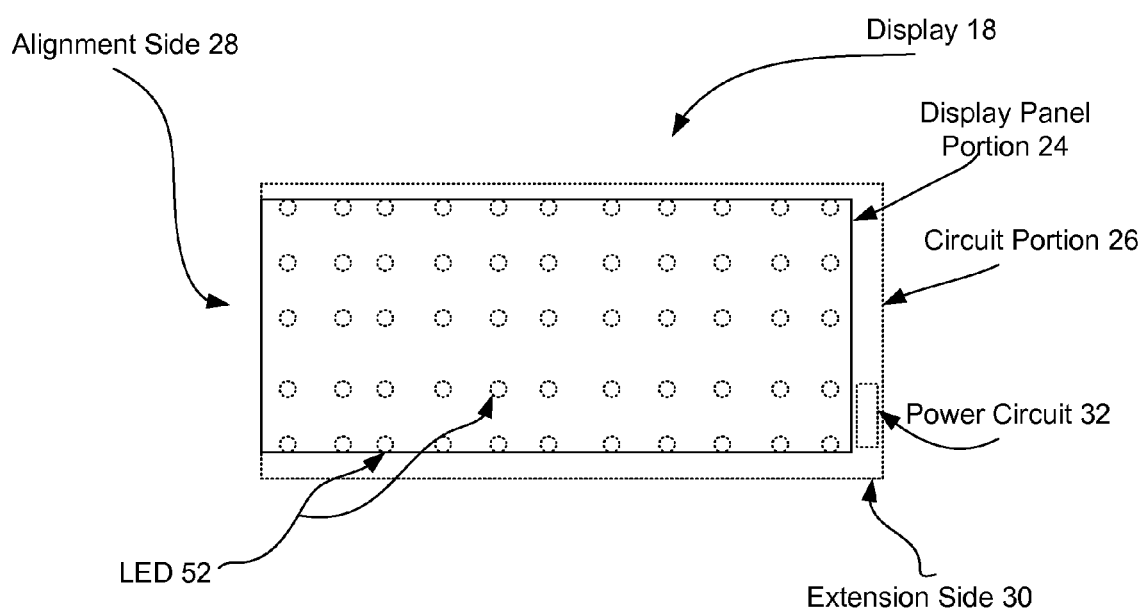
FIG. 5 depicts a display circuit portion in broken lines assembled beneath a display panel portion.

Referring now to FIG. 4, a blow-up view depicts a tablet information handling system 10 to illustrate assembly of a display 18 into tablet housing 14. Components for processing information are assembled into housing 14, such as processor 40, memory 42, a chipset 46, a battery 48 and a cooling fan 50. Peripheral ports 12 are assembled to communicate with motherboard 38 and disposed at the periphery of housing 14. Display 18 is assembled by coupling display panel portion 24 to circuit portion 26 in an offset manner with substantial alignment at an alignment side 28 and an extension of circuit portion 26 past display panel portion 24 at an extension side 30. Alignment of display portion 24 and circuit portion 26 at alignment side 28 provides full illumination with LEDs 52 distributed on circuit portion 26 and powered in part by power circuits disposed in the extension of circuit portion 26 on extension side 30. In various embodiments, various locations for LEDs 52 may be used and diffusers of different types may be used to diffuse light across display panel portion 24. Display 18 is assembled into housing 14 so that the aligned edges of display portion 24 and circuit portion 26 on alignment side 28 are adjacent to peripheral ports 12. Increased vertical height is made available by moving circuit portion 26 under display panel portion 24 so that the peripheral connectors 12 have the total height of display 18 available to position at opening 34. Referring now to FIG. 5, a display circuit portion 26 is depicted in broken lines assembled beneath a display panel portion 24 to illustrate one example embodiment of an assembled tablet information handling system according to the present disclosure. In the example embodiment, the display portion 24 is symmetrically disposed in housing 14 while the circuit portion 26 is non-symmetrically disposed beneath display portion 24.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having a perimeter;
   a processor disposed in the housing and operable to process information;
   memory disposed in the housing and interfaced with the processor, the memory operable to store the information; and
   a display disposed in the housing and interfaced with the processor, the display operable to present the information as visual images, the display having a display panel portion and a direct type backlight comprising a circuit board interfaced with the display panel portion, the circuit including circuits to support presentation of visual images at the display panel portion;
   wherein the display panel portion couples offset with the circuit board to have at least some of the circuit board extending past a first side of the display panel portion, the circuit board disposed substantially in alignment with a second side of the display panel portion opposite the first side.

2. The information handling system of claim 1 wherein:
   the display panel portion comprises a liquid crystal display panel operable to create the visual images; and
   the circuit board comprises one or more backlights operable to generate light that passes through the display panel to present the visual images.

3. The information handling system of claim 2 wherein the circuit board extending past the first side of the display panel portion comprises power circuits for powering the one or more backlights.

4. The information handling system of claim 1 further comprising one or more peripheral ports disposed at the second side adjacent the display panel portion and circuit board and exposed at the housing perimeter for accepting peripheral cables.

5. The information handling system of claim 1 wherein the display panel is symmetrically disposed in the housing and the circuit board is non-symmetrically disposed in the housing.

6. A method for manufacture of an information handling system, the method comprising:
   assembling a display by coupling a direct type backlight comprising a circuit board display panel to each other to align at a first side, the circuit board extending past the display panel portion at a second side opposite the first side;
   coupling the display to a housing having a perimeter, the circuit board at the second side adjacent the housing perimeter; and
   coupling one or more peripheral ports to the housing adjacent the display at a one end and the housing perimeter at an opposing end.

7. The method of claim 6 wherein the circuit board comprises a backlight operable to provide illumination to the display panel.

8. The method of claim 7 wherein the coupling the display to a housing further comprises aligning the display panel portion symmetrically in the housing, the circuit board having a non-symmetrical alignment relative to the housing.

9. The method of claim 7 further comprising coupling a bezel to the housing perimeter to cover the peripheral ports.

10. The method of claim 7 wherein the peripheral ports comprise USB ports.

11. A display comprising:
    a display panel having plural pixels, the pixels generating visual images by altering light that passes through the pixels, the display panel having four sides that form a perimeter;
    a direct type backlight comprising a circuit board coupled to the display panel, the circuit board having one or more backlights to provide light that passes through the display panel;
    wherein the circuit board extends past at least one side of the display panel and outside of the perimeter, and the circuit board remains within the perimeter along at least one of the other sides of the display panel.

12. The display of claim 11 wherein the circuit board comprises plural LED backlights that provide illumination to pass through the pixels.

13. The display of claim 12 wherein the circuit board that extends past at least one side of the display panel comprises power circuits to provide power to the plural LED backlights.

14. The display of claim 11 further comprising one or more external device connectors disposed adjacent the circuit board that remains within the perimeter.

15. The display of claim 14 wherein the device connectors comprise USB ports.

16. A method for assembly of a tablet information handling system, the method comprising:
    coupling a connector to a housing at a perimeter of the housing, the connector having an exposed end accessible through an opening of the housing for coupling with a cable;
    coupling a display to the housing adjacent to the connector at an overlapping vertical height with the connector, the display having a display portion and a direct type backlight comprising a circuit board, the circuit board outside a perimeter of the display portion in a location distal the connector; and
    covering the perimeter of the display with a housing upper portion coupled over the housing.

17. The method of claim 16 wherein the covering the perimeter further comprises exposing the display portion symmetrically centered in the housing.

18. The method of claim 16 wherein the circuit board comprises a backlight that provides illumination to the display portion.

19. The method of claim 18 wherein the circuit board that extends outside the perimeter of the display portion comprises power circuits for providing power to the backlight.

20. The method of claim 19 wherein the connector comprises a USB port.

* * * * *